United States Patent
Jacobs

(10) Patent No.: US 9,569,220 B2
(45) Date of Patent: Feb. 14, 2017

(54) PROCESSOR BRANCH CACHE WITH SECONDARY BRANCHES

(71) Applicant: Synopsys, Inc., Mountain View, CA (US)

(72) Inventor: Eino Jacobs, Belmont, CA (US)

(73) Assignee: Synopsys, Inc., Mountain View, CA (US)

( * ) Notice: Subject to any disclaimer, the term of this patent is extended or adjusted under 35 U.S.C. 154(b) by 306 days.

(21) Appl. No.: 14/507,740

(22) Filed: Oct. 6, 2014

(65) Prior Publication Data

US 2015/0100769 A1    Apr. 9, 2015

Related U.S. Application Data

(60) Provisional application No. 61/887,439, filed on Oct. 6, 2013.

(51) Int. Cl.

| | | |
|---|---|---|
| *G06F 7/38* | (2006.01) | |
| *G06F 9/30* | (2006.01) | |
| *G06F 9/38* | (2006.01) | |
| *G06F 12/08* | (2016.01) | |

(52) U.S. Cl.
CPC .......... *G06F 9/3816* (2013.01); *G06F 9/3806* (2013.01); *G06F 9/3844* (2013.01); *G06F 12/0895* (2013.01)

(58) Field of Classification Search
None
See application file for complete search history.

(56) References Cited

U.S. PATENT DOCUMENTS

| | | | | |
|---|---|---|---|---|
| 2003/0182543 A1* | 9/2003 | Keller | ................ | G06F 9/30149 |
| | | | | 712/237 |
| 2012/0079303 A1* | 3/2012 | Madduri | ............... | G06F 1/3203 |
| | | | | 713/324 |
| 2014/0281440 A1* | 9/2014 | Tu | ......................... | G06F 9/3804 |
| | | | | 712/239 |
| 2016/0132331 A1* | 5/2016 | Godard | ............... | G06F 9/30047 |
| | | | | 711/137 |

* cited by examiner

*Primary Examiner* — Hyun Nam
(74) *Attorney, Agent, or Firm* — Fenwick & West LLP

(57) ABSTRACT

A processor uses a prediction unit to predict subsequent instructions of a program to be executed by the processor. Many implementations or combinations of implementations may be used to predict the subsequent instruction of the program. In one embodiment, a branch cache is used to store branch information. A prediction table is used to store prediction information based on the branch. A prediction logic module determines whether a branch is taken or not taken based on the branch information stored in the branch cache and the prediction information stored in the prediction table.

18 Claims, 7 Drawing Sheets

| | Value | Name | description | opcodes |
|---|---|---|---|---|
| 510 | 0 | BR_NOT_PREDICTED | any instruction other than a valid predicted branch | |
| 520 | 1 | BR_EI_S | EI_S instruction | EI_S |
| 530 | 2 | BR_CONDITIONAL | conditional and predicted | BBIT0, BBIT1, Bcc, BRcc, Jcc, Bcc_S, BREQ_S, BRNE_S |
| 540 | 3 | BR_UNCONDITIONAL | unconditional branch always taken | B, BI, BIH, J, B_S, J_S |
| 550 | 4 | BR_COND_CALL | conditional subroutine call | JLcc, BLcc |
| 560 | 5 | BR_CALL | unconditional subroutine call | JL, JL_S, BL, BL_S, JLI_S |
| 570 | 6 | BR_COND_RETURN | conditional subroutine return | Jcc [blink], JEQ_S [blink], JNE_S [blink] |
| 580 | 7 | BR_RETURN | unconditional subroutine return | J [blink], J_S [blink], LEAVE_S(if u[6]==1) |

FIG. 5

```
        bc_entry[`BR_BC_DATA_RANGE] = {
        `if (`BR_HAS_SECONDARY == 1)
        `if (`HAS_ICACHE == 1)
620 ─        secondary_way[`IC_WAYS_BITS_RANGE],
        `endif
625 ─        secondary_offset[1:0], // secondary branch
630 ─        secondary_valid,
635 ─        secondary_f_bit,
        `endif
640 ─        tag[`BR_BC_TAG_RANGE],
645 ─        offset[1:0], // primary branch
650 ─        type[2:0],
655 ─        bta[31:1],
        `if (`HAS_ICACHE == 1)
670 ─        way[`IC_WAYS_BITS_RANGE],
        `endif
675 ─        size[1:0],
680 ─        d_bit,
685 ─        f_bit
        }
```

FIG. 6

PROCESSOR BRANCH CACHE WITH SECONDARY BRANCHES

CROSS REFERENCE TO RELATED APPLICATIONS

This application claims the benefit of U.S. Provisional Application No. 61/887,439, filed Oct. 6, 2013, which is incorporated by reference in its entirety.

BACKGROUND

1. Field of Art

This disclosure relates generally to branch cache architecture implemented in a configurable processing device.

2. Description of the Related Art

Factors such as the frequency with which information is retrieved from memory and the number of cycles to execute program elements make power consumption a constraint on processor operation. Additionally, latency caused by a number of cycles to fetch instructions from memory and look-up instructions in memory further constrains processor operation. Branch prediction improves performance by fetching instructions in advance, based on a prediction of which instructions are executed by a program.

BRIEF DESCRIPTION OF THE DRAWINGS

The teachings of the embodiments herein can be readily understood by considering the following detailed description in conjunction with the accompanying drawings.

FIG. 5 is a table of branch instructions, according to one embodiment.

FIG. 6 is a listing of branch cache entries, according to one embodiment.

OVERVIEW

A processor includes an instruction fetch unit and an execution unit. The instruction fetch unit retrieves instructions from memory to be executed by the execution unit. The instruction fetch unit includes a branch prediction unit which is configured to predict whether a branch instruction is likely to be executed. In one embodiment, the branch prediction unit includes a branch cache, where each entry in the branch cache includes branch information associated with a primary branch and a secondary branch. In one embodiment, the branch information associated with the primary branch is the branch target address for the primary branch. The branch information associated with the secondary branch is an address offset.

The branch prediction unit also includes a prediction table that stores prediction information associated with a branch instruction. The prediction information specifies the likelihood of a branch instruction being taken or not taken. Further, the branch prediction unit includes a prediction logic module that calculates a branch target address associated with the secondary branch based on the address offset associated with the secondary branch and a predicted branch direction (e.g., whether the branch is taken or not taken) of the secondary branch. In one example, the prediction logic module calculates the branch target address for the secondary branch based on a program counter value and the address offset associated with the secondary branch. Thus, the branch target address associated with the secondary branch may be calculated on the fly and does not require the branch target address to be stored in the branch cache.

DETAILED DESCRIPTION OF EMBODIMENTS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
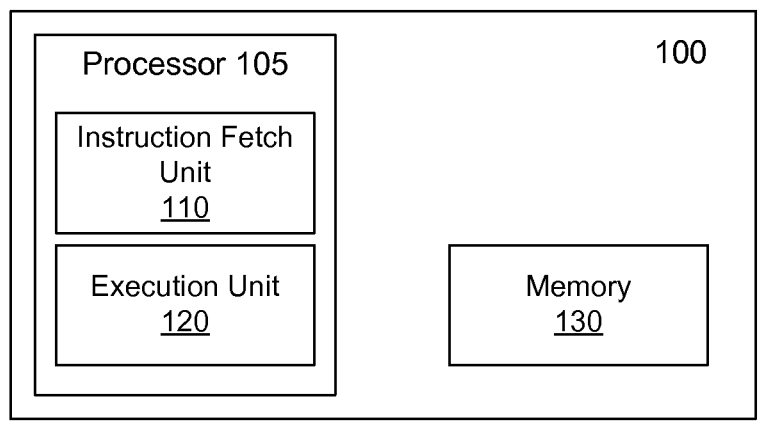
FIG. 1 is a block diagram of a processor pipeline system that includes an instruction fetch unit and an execution unit, according to one embodiment.

Embodiments of the present disclosure relate to components and methods for implementing branch prediction and instruction fetch in a processor. FIG. 1 is a block diagram of one embodiment of a processor pipeline system 100 including a processor 105 and a memory module 130. The processor 105 executes a program by retrieving instructions that comprise the program from the memory 130 and executing actions described by the retrieved instructions. The processor 105 may be programmed to operate as a reduced instruction set computing (RISC) processor, digital signal processor (DSP), graphics processor unit (GPU), applications processor (e.g., a mobile application processor), video processor, or a central processing unit (CPU) to access memory map, and exchange commands with other computing devices. In some embodiments, the processor 105 includes a pipeline. The pipeline includes multiple data processing stages connected in series. The processor 105 may be a single or multiple processor cores represented in an electronic format. In one example, the processor 105 is a configurable processor core represented in circuit description language, such as register transfer language (RTL) or hardware description language (HDL). In another example the processor 105 may be represented as a placed and routed design or design layout format (e.g., graphic data system II or GDS II).

In one embodiment, the processor 105 includes an instruction fetch unit 110 and an execution unit 120. An instruction fetch unit 110 fetches an instruction from memory 130 and issues it to the execution unit 120 that executes the fetched instruction. Each instruction represents a process or function (as part of a program execution path). For example, a branch instruction conditionally instructs the processor to execute a different instruction that may not be sequential to the branch instruction.

The memory 130, in one example, stores instructions that represent a process or function as part of a program execution path. The memory 130 may include an instruction cache for storing instructions or blocks or a plurality of instructions to be accessed by the instruction fetch unit 110.

Figure 2:
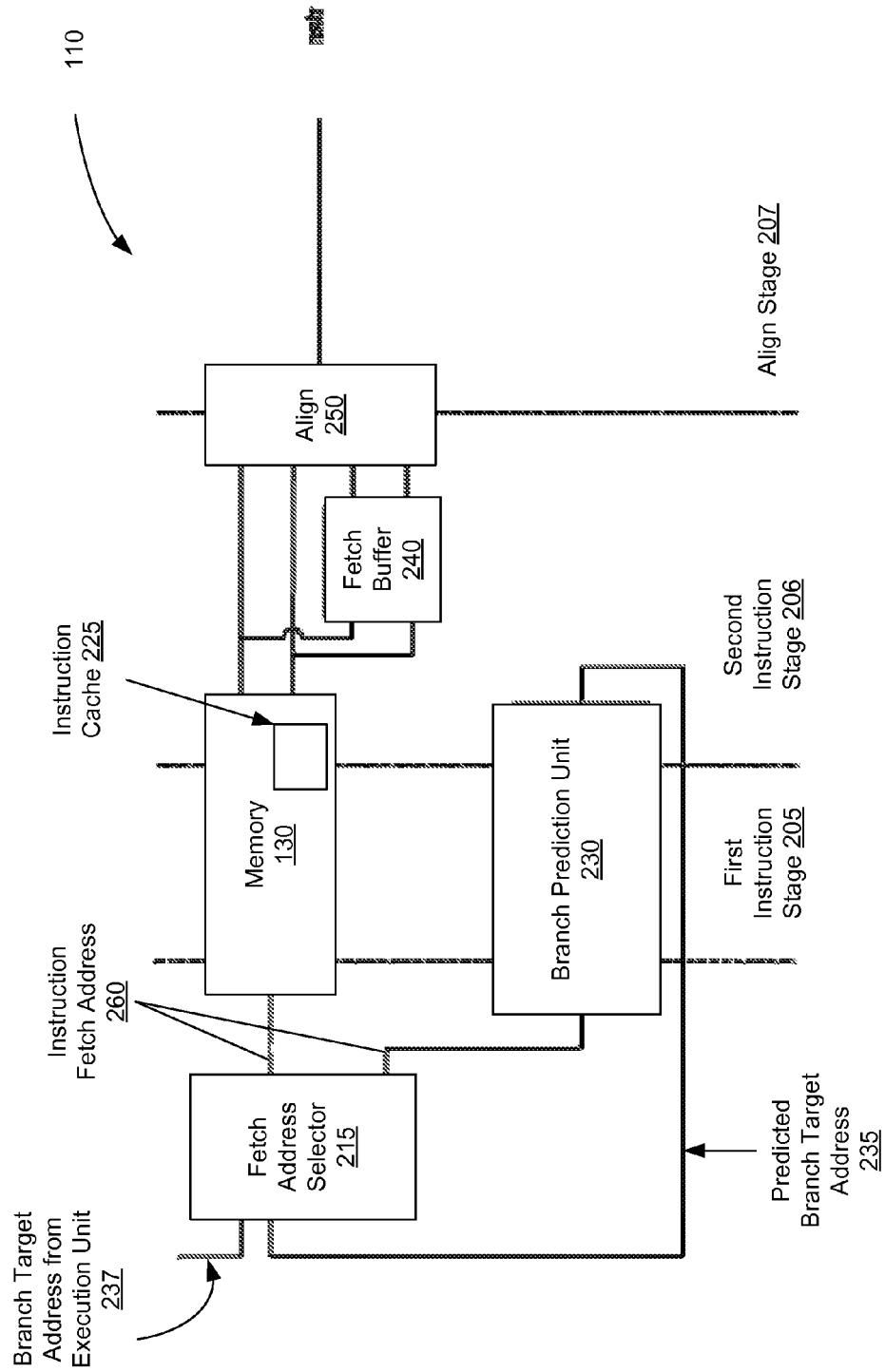
FIG. 2 is a block diagram of an expanded view of the instruction fetch unit from FIG. 1, according to one embodiment.

FIG. 2 is a block diagram of an expanded view of one embodiment of the instruction fetch unit 110. In the embodiment of FIG. 2, the instruction fetch unit 110 includes a fetch address selector 215, branch prediction unit 230, a fetch buffer 240 and an align block 250. The instruction fetch unit 110 may operate in three cycles and includes three pipeline stages: a first instruction stage 205, a second instruction stage 206, and an align stage 207. During the first instruction stage 205 and the second instruction stage 206, the instruction fetch unit 110 retrieves one or more instructions from a location in memory 130 or an instruction cache 225, as described with reference to FIG. 2, and the branch prediction unit 230. Retrieval of the one or more instructions consumes two cycles to allow high-speed processor operation. During the third fetch stage, the align block 250 in the instruction fetch unit 110 aligns the retrieved one or more instructions. The aligned one or more instructions are then communicated to the execution unit 120. In another embodiment, different numbers of cycles may be taken to retrieve one or more instructions and/or to align the retrieved instructions. In the example of FIG. 2, the retrieval of instructions associated with branch target addresses is discussed.

The fetch address selector 215 selects an instruction fetch address 260 to retrieve from memory 130 or from an instruction cache 225 included in memory 130, based on the branch target address from the execution unit 237 or based on the predicted branch target address 235 received from the branch prediction unit 230, as is further described in conjunction with FIG. 3 below. A branch target address is an address in memory 130 identifying an instruction as a result of the execution of a branch instruction. The execution unit 120 on executing a previous branch instruction may generate a branch target address 237. Alternatively, the branch prediction unit 230 or predicting whether a branch instruction is executed or not (taken or not taken) generates a predicted branch target address 235. The fetch address selector 215 generates an instruction fetch address 260 representing the address in memory 130 or the instruction cache 225 of the subsequent instruction to be fetched by the instruction fetch unit 110 based on either the predicted branch target address 235 or the branch target address received from the execution unit 215 as is further described in conjunction with FIG. 3 below.

In one embodiment, the memory 130 is coupled to the fetch buffer 240, which may be bypassed. The fetch buffer 240 stores blocks of instructions retrieved from memory 130 before the instructions are communicated to the align block 250, which aligns the instructions for execution. This ensures that a compatible interface is present between the steps of predicting instructions, fetching instructions and aligning instructions.

Branch prediction is important as it reduces the time taken for an instruction pipeline to execute an instruction. The branch prediction unit 230 is primarily used to predict the possible direction of the program based on a branch instruction. A branch instruction conditionally instructs the processor to execute a different instruction not necessarily present directly after the branch instruction in the instruction flow of the program. For example, when a program contains a conditional statement, such as an if statement, the branch instruction instructs the processor to retrieve instructions from memory 220 based on the result of the conditional if statement. The branch prediction unit 230 outputs a predicted branch target address 235 which represents the predicted address in instruction memory 220 that the branch has been predicted to branch to.

Figure 3:
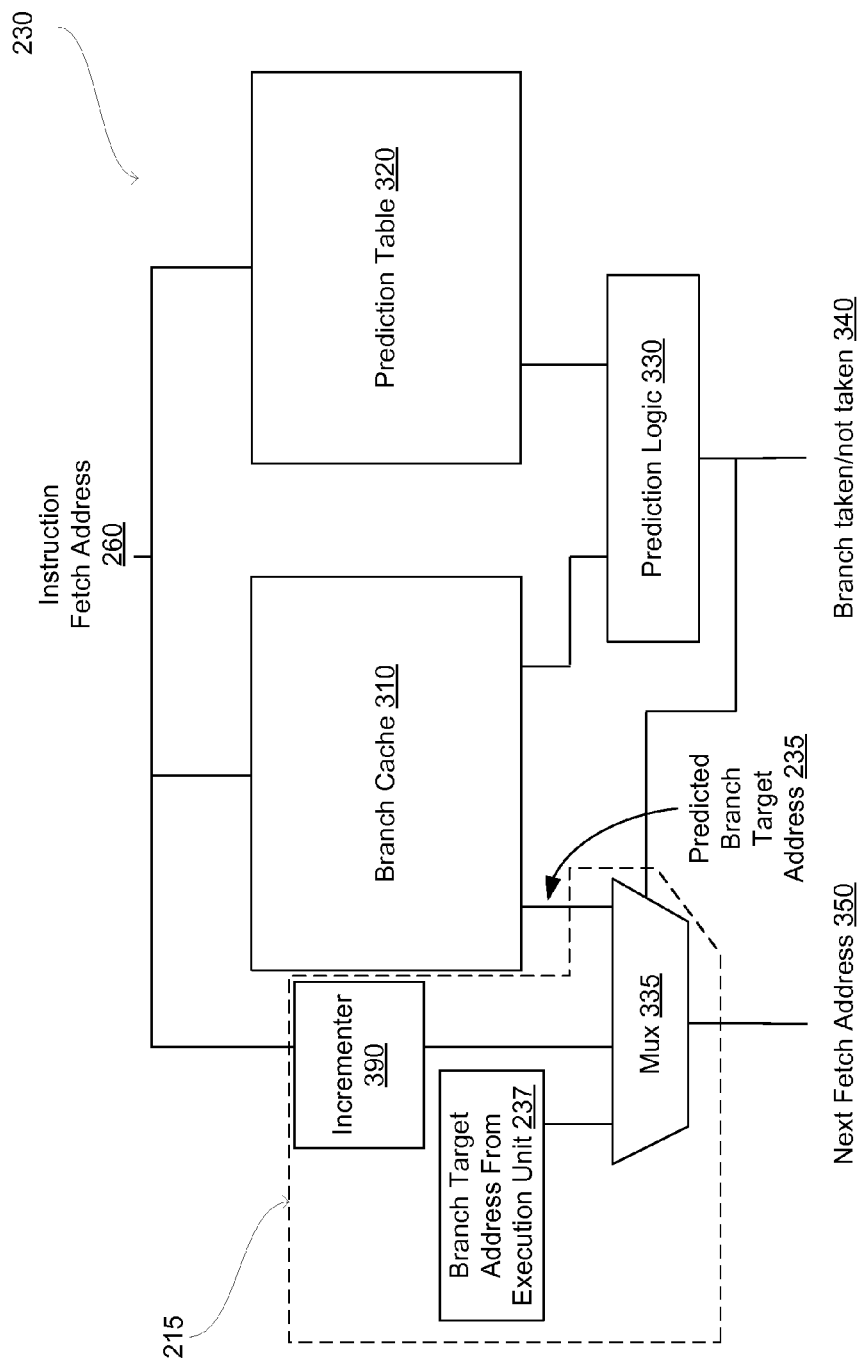
FIG. 3 is a block diagram of an expanded view of the branch prediction unit from FIG. 2, according to one embodiment.

FIG. 3 is a block diagram of the branch prediction unit 230 and the fetch address selector 215, according to one embodiment. The branch prediction unit 230 includes a branch cache 310, a prediction table 320, and a prediction logic module 330. The fetch address selector 215 includes an incrementer 390 and a mux 335. The branch prediction unit 230 receives an instruction fetch address 260. The instruction fetch address 260 represents the address in memory 130 containing the data representing an instruction, according to one embodiment. The branch cache 310 contains information about branches in the program that are or will be executed by the processor 105 via the execution unit 120. The branch cache 310 stores the predicted branch target address for branch predictions made by the branch prediction unit 230.

Figure 4:
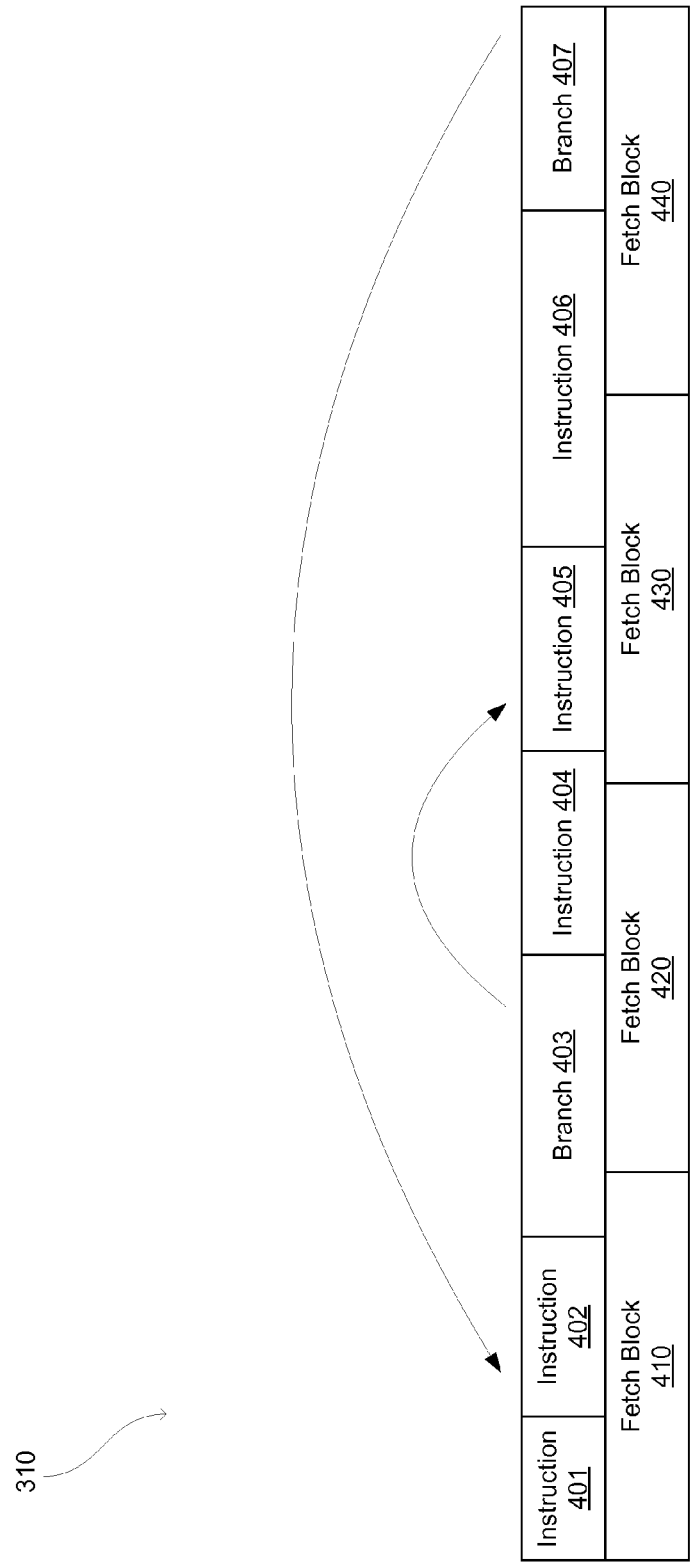
FIG. 4 is an example of fetch blocks and unaligned instructions, according to one embodiment.

In one embodiment, the instruction cache 225 includes a plurality of fetch blocks, with each fetch block including a group of stored and unaligned instructions. An example of fetch blocks is shown in FIG. 4. Instructions may have variable lengths and can exist across the boundary of two fetch blocks. Based on the kind of an instruction, an instruction may occupy, one fetch block or a part or a whole of additional fetch blocks. In the example of FIG. 4, fetch block 410 includes instruction 401, instruction 402, and a portion of branch instruction 403. Fetch block 420 includes the remaining portion of branch instruction 403 and a portion of instruction 404. Fetch block 430 includes the remaining portion of instruction 404, instruction 405, an a portion of instruction 406. Fetch block 440 includes the remaining portion 406 and includes branch instruction 407.

Prior to execution, an entire instruction is fetched from its respective fetch blocks. For example, prior to the execution of instruction 406, the portions of instruction 406 included in both fetch blocks 430 and 440 needs to be fetched. In one embodiment, the alignment block 250 aligns instructions, by ensuring that the entire instruction has been fetched from its respective fetch blocks prior to forwarding the instruction to the execution unit 120. An instruction run is a sequence of instructions that terminates with a taken branch and that may include branches that are not taken. The instruction run has an entry point corresponding to the initial instruction in the instruction run in a fetch block and an exit point, which is an instruction to branch, in the same or a different, sequential fetch block. In the example of FIG. 4, instruction 402 has an entry point in fetch block 410, and an instruction run including instruction 402 has an exit point out of fetch block 420 based on a branch instruction 403 to branch to instruction 405. Because of the branch instruction 403, the instruction run has an entry point into fetch block 430, which includes instruction 405. The instruction run continues by executing instruction 406, and has an exit point out of fetch block 440 because of the branch instruction 407 to branch to instruction 402.

Returning to FIG. 3 the prediction table 320 stores predictions related to one or more directions associated with each branch instruction in the program. For example, the prediction table may hold a taken or not taken 340 prediction with respect to a branch instruction. In one example a taken 340 prediction refers to the branch being executed by the processor as predicted by the branch prediction unit 230. The prediction table 320 may be populated by the branch prediction unit 230 based on previous instances of branch instructions in the branch cache being taken or not taken 340.

In one embodiment, the prediction logic 330 determines if branches are taken or not taken 340 based on the branch information stored in the branch cache 310 and the predictions related to the branch stored in the prediction table 320. If the prediction is determined to be taken 340 the address mux 335 selects a next fetch address 350 as the predicted branch target address 235 from the branch cache 310. If the prediction is determined to be not taken 340 the address mux selects the next fetch address 350 as the address of the next sequential fetch block calculated with an incrementer 390. In the case of a branch mispredict or restart the next fetch address 350 is determined to be the branch target address 237 provided by the execution unit 120.

FIG. 5 illustrates various instructions that can change the flow of a program, according to one embodiment. Each group of instruction types is given a name and a description as shown in the name and description columns. Each instruction group is also given a value. The value column represents a 3-bit type field associated with each instruction. Each instruction also has an "opcode" or operation code that represents each individual instruction within a group of instructions. The execution unit 120 signals the correct branch prediction type to the instruction fetch unit 110 when branches are committed based on the opcode. In one example, a value of 0 (510) indicates that the branch cache entry is invalid or represents any instruction that is not a valid predicted branch.

For conditional branch instructions 530, 550, 570 a prediction of the branch direction is made using the prediction table 320. The prediction can be taken or not taken 340. If the prediction is taken, the next fetch address 350 will be the branch target address 305 stored in the branch cache 310. If the prediction is not taken, the next fetch address 350 will be the next sequential fetch block.

In one embodiment, unconditional instructions 520, 540, 560, 580 are always predicted taken 340. The next fetch address 350 will be the branch target address 235 stored in the branch cache 310. In another embodiment, both a pc-relative branch and a computed branch have predicted branch target addresses 235 stored in the branch cache 310. The prediction of a subroutine is supported with a return stack. For subroutine calls of type BR_COND_CALL 550 and BR_CALL 560 that are predicted taken 340, a return address is pushed onto the return stack. For subroutine returns of type BR_COND_RETURN 570 and BR_RETURN 580 that are predicted taken the branch prediction unit 203 gets the predicted branch target address 235 by popping the return stack. An EI_S 520 instruction is a code density instruction that receives special handling in the instruction fetch unit 110.

Returning to FIG. 3 the branch cache 310 is split into 2 cache banks, according to one embodiment. In this embodiment, the memory 130 is also split into two banks. Hence, each branch cache 310 bank makes a branch prediction for each of the memory 130 banks. In one embodiment the branch cache 310 and the prediction table 320 are each partitioned into 2 banks, hence 4 RAM banks are used in total. In this embodiment, the prediction logic 330 combines the prediction of both banks into a single prediction. For instance, if both banks have a predicted taken branch 340, then the branch from the bank with the lowest address is taken.

In one embodiment, a branch cache 310 entry can store information about 2 branches per fetch block, a primary branch and a secondary branch. The primary branch can be any type of branch and the branch target address 235 for that branch is stored in the branch cache 310 entry. The secondary branch is a PC-relative branch for which the branch target address 235 is not stored in the branch cache 310 but calculated on the fly from the displacement encoded in the instruction itself. In one embodiment, to keep the implementation of storing 2 branches per fetch block simple, the secondary branch is subject to the following restrictions:

1. The type of the branch must be BR_CONDITIONAL 530.
2. The opcode must be one of, Bcc, BRcc, BEQ_S, BNE_S, BRNE_S, BREQ_S.
3. The secondary branch is not allowed to have a delay slot.

The opcodes included in the restrictions shown above are based on the ARC® Processor architecture, a processor that is commercially available from Synopsys, Inc. and the ARCv2 Instruction Set Architecture. An example of storing in the branch cache 310 a primary branch and a secondary branch per branch cache 310 entry is the handling of the BEQ_S instruction. Any branch or jump instruction can be stored in a branch cache entry as the primary branch. In this example, the secondary branch stored in the branch cache 310 entry is the BEQ_S instruction. The BEQ_S instruction is a conditional branch 530 instruction. The branch is taken 340 if the Zero-flag is set, indicating that some earlier instruction gave a result of 0. The BEQ_S is a 16-bit instruction encoded with the following bit pattern "1111001ssssssss". The first portion of the 16-bit encoded instruction (1111001) is the opcode indicating that the instruction is a BEQ_S instruction. The second portion of the 16-bit encoded instruction (sssssssss) is a 9-bit number that indicates the displacement to the branch target. When the processor executes the BEQ_S instruction, and the condition is true (i.e. the Zero-flag is set to 1), then the next instruction to be executed, the secondary branch target, is the one stored at byte address: branch target address=PCL+ (displacement*2). PCL is the byte address 235 of the BEQ_S instruction in the program, rounded down to the next lower boundary of 4, to make it a multiple of 4 bytes. In this example, the branch target address associated with the secondary branch is calculated on the fly and is not stored in the branch cache 310 entry. Thus, by including the secondary branch in the same branch cache 310 entry as the primary branch the processor is able to execute the secondary branch on the fly without having to predict or determine the branch target address associated with the secondary branch in a similar fashion as the branch target address associated with the primary branch.

In one embodiment, the branch cache 310 is direct mapped and indexed by the fetch block address. For example, a branch cache 310 may have 512 entries (256 per bank). Then each branch cache 310 index would have 9 bits of which the lowest bit addresses the bank. An example of code representing such an implementation is given below:

```
bc_index[8:0] = PC[11:3];
bc_bank_index[7:0] = PC[11:4]; bc_bank=PC[3];
```

FIG. 6 is an exemplary implementation of branch cache 310 entries, according to one embodiment. A tag field is a branch cache tag used to distinguish fetch blocks that map to the same branch cache 310 entry. The tag can be a full tag consisting of all high order bits of the address to the cache 310. However, in branch prediction this tag may be a partial tag. In one embodiment, the accuracy of the cache doesn't need to be 100% and some undetected aliasing of branch cache 310 entries is allowed. The parameter BR_BC_TAG_RANGE 640 is used to configure the range of address bits used for a partial tag. With BR_BC_FULL_TAG=1 a full tag is used. The tag is common for both primary and secondary branches.

The Type field is the 3-bit type 650 of the primary branch. When there is no valid primary branch in the branch cache 310 entry, the Type field 650 is set to 0. An offset field 645 is an address offset (one of 4 possible instruction locations) of the primary branch in the fetch block. BTA 655 is the predicted branch target address 235 of the primary branch. A Way field 620, 670 is a way prediction in the instruction cache 225 for the BTA 655 of the primary branch. For example a 4-way set-associative instruction cache 225 has a 2-bit Way field.

In one embodiment a size field 675 encodes the size of the primary branch instruction plus a potential delay 680 slot instruction (the size in half words is the Size field+1). The size field 675 is used to calculate the return address for a subroutine call. The delay slot 680 (D_bit) indicates the branch instruction has a delay slot. For example, if D_bit=1 the instruction has a delay slot 680; if D-bit=0 the instruction does not have a delay slot 680. An F_bit 685 indicates that the next fetch block must still be fetched for this branch instruction before the branch can be taken, because the 'tail' of the branch instruction or its delay slot 680 instruction straddles a fetch block boundary and spills into the next fetch block.

In one embodiment, if there is a secondary branch stored in a branch cache 310 entry, then the secondary_valid 630 field is set to 1, otherwise it is set to 0. A secondary_offset 625 is the address offset (one of 4 possible instruction locations) of the secondary branch in the fetch block. A secondary_way field 620 is the way prediction for the BTA 655 of the secondary branch. A secondary_f_bit 635 indicates a fetch_tail for the secondary branch. This is important as the next fetch block must still be fetched for this branch instruction before the branch can be taken 340, because the 'tail' of the branch instruction or its delay slot 680 instruction may straddle a fetch block boundary and spill into the next fetch block.

In one embodiment the branch prediction unit 230 runs in parallel to the fetching of the fetch block from the instruction cache 225. The branch prediction unit 230 predicts a sequence of instruction runs and the respective fetch blocks associated with those instruction runs. Hence, the branch prediction unit 230 determines a sequence of fetch blocks representing the program execution path. In one embodiment the branch prediction unit 230 first determines whether or not a fetch block contains a taken branch 340. If so, the branch prediction unit 230 provides the instruction fetch unit 110 with a predicted branch target address 235. Hence, the branch target address 235 will be the next fetch address 350 for the instruction fetch unit 110.

When no branch is taken the branch prediction unit 230 first fetches the next sequential fetch block based on the current instruction fetch address 260 incremented by a fetch block size. Then the branch prediction unit 230 makes a prediction based on the instructions in the fetch block and a prediction information stored in the branch prediction unit 230. As the branch prediction unit 230 does not depend on the other blocks of the instruction fetch unit 110, and relies solely on the prediction information present in the branch prediction unit 230 to make predictions, it is in some sense decoupled from the rest of the pipeline. Hence, branch prediction can run independent of the instruction fetch process, and thus populate the fetch buffer 240 with fetch blocks that are predicted to be needed for the next instruction fetch.

In one embodiment the prediction output by the branch prediction unit 230 includes a way prediction. A way prediction is a prediction predicting the set element or 'way' in a set-associative instruction cache. For instance, in a 4-way set-associative cache a fetch block can be stored in one of 4 locations in the instruction memory, those 4 locations being the 4 ways. The way prediction predicts in which of the 4 cache 220 locations in the for example 4-way set-associative instruction cache the fetch block, for which the prediction is made, is located so that it can be accessed quickly by the instruction fetch unit 110 in future cycles while executing a program. The benefit of way prediction is that it saves both power and energy. This is particularly important when the instruction fetch unit 110 accesses a set associative cache. A set associative cache refers to the structure where each location in memory can be stored in or is mapped to one or more locations on the cache. Each cache 225 entry is identified by a cache tag that identifies the instruction on the cache 225 or the location of the instruction in main memory 220. Way prediction hence predicts the 'way' or mapping of the fetch blocks in the instruction cache 225 to their location in the instruction memory 220. This is beneficial as the instruction fetch unit 110 does not have to determine the location of sequential fetch blocks in memory based on the number of ways associated to a cache location when the instruction fetch unit 110 is retrieving data from the instruction memory.

Figure 7:
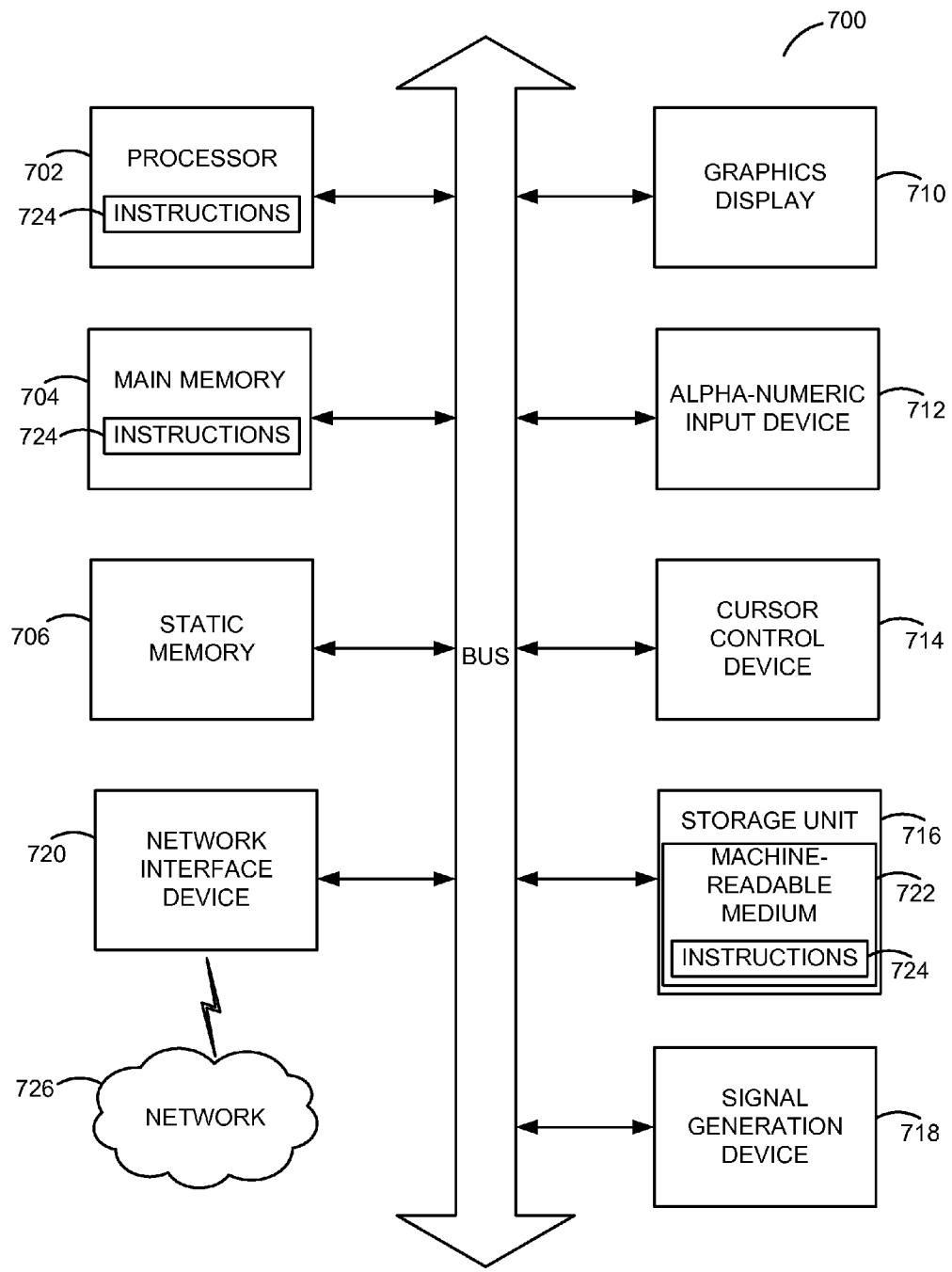
FIG. 7 is a block diagram illustrating components of an example machine able to read instructions from a machine-readable medium and execute them in a processor (or controller), according to one embodiment.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. The computer system 700 may be used to perform operations associated with designing a test circuit including a plurality of test core circuits arranged in a hierarchical manner.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702

(e.g., within a processor's cache memory) during execution thereof by the computer system 700, the main memory 704 and the processor 702 also constituting machine-readable media. The instructions 724 (e.g., software) may be transmitted or received over a network 726 via the network interface device 720. The machine-readable medium 722 may also store a digital representation of a design of a test circuit.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

SUMMARY

The foregoing description has been presented for the purpose of illustration; it is not intended to be exhaustive or to limit the description to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the description is intended to be illustrative, but not limiting, in scope.

What is claimed is:

1. An integrated circuit comprising:
    a branch cache that stores, in a single branch cache entry, branch information about a primary branch and a secondary branch, the branch information including a branch target address for the primary branch in an instruction fetch block and an address offset of the secondary branch in the instruction fetch block; and
    a branch prediction logic module that calculates a branch target address for the secondary branch in the instruction fetch block based on the address offset of the secondary branch and a predicted branch direction of the secondary branch.

2. The integrated circuit of claim 1, wherein the branch cache is comprised of two cache banks.

3. The integrated circuit of claim 1, wherein the secondary branch is a conditional branch.

4. The integrated circuit of claim 1, wherein the secondary branch is not associated with a delay slot.

5. The integrated circuit of claim 1, wherein the branch prediction logic module calculates the predicted branch direction of the secondary branch based on prediction information associated with the secondary branch stored in a prediction table.

6. The integrated circuit of claim 1, wherein the prediction logic module calculates the branch target address for the secondary branch based on the address offset of the secondary branch and a program counter value.

7. A non-transitory computer readable medium storing instructions that when executed by a processor generate a representation of an electronic circuit, the electronic circuit comprising:
    a branch cache that stores, in a single branch cache entry, branch information about a primary branch and a secondary branch, the branch information including a branch target address for the primary branch in an instruction fetch block and an address offset of the secondary branch in the instruction fetch block; and
    a branch prediction logic module that calculates a branch target address for the secondary branch in the instruction fetch block based on the branch target address offset of the secondary branch and a predicted branch direction of the secondary branch.

8. The non-transitory computer readable medium of claim 7, wherein the branch cache is comprised of two cache banks.

9. The non-transitory computer readable medium of claim 7, wherein the secondary branch is a conditional branch.

10. The non-transitory computer readable medium of claim 7, wherein the secondary branch is not associated with a delay slot.

11. The non-transitory computer readable medium of claim 7, wherein the generated branch prediction logic module calculates the predicted branch direction of the secondary branch based on prediction information associated with the secondary branch stored in a prediction table.

12. The non-transitory computer readable medium of claim 7, wherein the generated prediction logic module calculates the branch target address for the secondary branch based on the address offset of the secondary branch and a program counter value.

13. A method comprising:
    retrieving a secondary information associated with a secondary branch stored in a branch cache entry of a branch cache, the branch cache entry comprising branch cache information associated with a primary branch and the secondary branch, the secondary branch information including an address offset associated with the secondary branch; and
    determining, by a processor, a branch target address associated with the secondary branch based on the address offset associated with the secondary branch and a predicted branch direction of the secondary branch.

14. The method of claim 13, wherein the branch cache is comprised of two cache banks.

15. The method of claim 13, wherein the secondary branch is a conditional branch.

16. The method of claim 13, wherein the secondary branch is not associated with a delay slot.

17. The method of claim 13, wherein the predicted branch direction of the secondary branch is based on prediction information associated with the secondary branch stored in a prediction table.

18. The method of claim 13, wherein the branch target address for the secondary branch is based on the address offset of the secondary branch and a program counter value.

* * * * *